:::

(12) United States Patent
Ahn et al.

(10) Patent No.: US 8,251,093 B2
(45) Date of Patent: Aug. 28, 2012

(54) FUEL SUPPLY APPARATUS FOR A COMBUSTOR

(75) Inventors: Jin-Goo Ahn, Suwon-si (KR);
Sung-Chul Lee, Suwon-si (KR);
In-Hyuk Son, Suwon-si (KR);
Woo-Cheol Shin, Suwon-si (KR);
Jong-Rock Choi, Suwon-si (KR);
In-Seob Song, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 421 days.

(21) Appl. No.: 12/639,932

(22) Filed: Dec. 16, 2009

(65) Prior Publication Data
US 2010/0269912 A1    Oct. 28, 2010

(30) Foreign Application Priority Data

Apr. 22, 2009   (KR) .................. 10-2009-0035012

(51) Int. Cl.
*F16K 11/20*     (2006.01)
*F16K 11/074*    (2006.01)
*F23N 1/02*      (2006.01)
(52) U.S. Cl. ............... 137/597; 137/625.11; 431/12
(58) Field of Classification Search .......... 137/597, 137/625.11, 627; 429/441, 512, 513; 431/12; 48/61, 197 R
See application file for complete search history.

(56) References Cited

U.S. PATENT DOCUMENTS

| 4,458,708 | A  | * | 7/1984 | Leonard et al. ............ 137/9 |
| 2009/0011287 | A1 | * | 1/2009 | Lee et al. ............ 429/13 |
| 2009/0211641 | A1 | * | 8/2009 | Tipotsch ............ 137/1 |
| 2010/0180564 | A1 | * | 7/2010 | Ziminsky et al. ............ 60/39.1 |

FOREIGN PATENT DOCUMENTS

| JP | 11-101434 | 4/1999 |
| JP | 3035539 | 2/2000 |
| JP | 2002-250508 | 9/2002 |
| JP | 2006-114340 | 4/2006 |
| JP | 2006-236831 | 9/2006 |
| KR | 10-2003-0011036 A | 2/2003 |

OTHER PUBLICATIONS

KIPO Office action dated Oct. 19, 2011, for application 10-2009-0035012, 1 sheet.

* cited by examiner

*Primary Examiner* — John Rivell
*Assistant Examiner* — Hailey K Do
(74) *Attorney, Agent, or Firm* — Christie, Parker & Hale, LLP

(57) ABSTRACT

A fuel supply apparatus for a combustor configured to prevent or substantially prevent a flashback from being generated from the combustor. A fuel supply apparatus includes a fuel distribution part having a first opening part and a second opening part, the fuel distribution part configured to alternately discharge a fuel from the first opening part and the second opening part; and a housing having a first channel and a second channel, wherein an intermediate part of the first channel is coupled to and in fluid communication with the first opening part, and an intermediate part of the second channel is coupled to and in fluid communication with the second opening part.

16 Claims, 4 Drawing Sheets

FUEL SUPPLY APPARATUS FOR A COMBUSTOR

CROSS-REFERENCE TO RELATED APPLICATION

This application claims priority to and the benefit of Korean Patent Application No. 10-2009-0035012, filed on Apr. 22, 2009, in the Korean Intellectual Property Office, the entire content of which is incorporated herein by reference.

BACKGROUND

1. Field

Embodiments of the present invention relate to a fuel supply apparatus, and more particularly, to a fuel supply apparatus for a combustor.

2. Description of the Related Art

A fuel cell is a power generation system that directly converts chemical energy into electric energy by electro-chemically reacting hydrogen and oxygen. A fuel cell may typically be classified as a polymer electrolyte membrane fuel cell, a direct methanol fuel cell, a phosphoric acid fuel cell, a molten carbon fuel cell, and a solid oxide fuel cell. These respective fuel cells are basically operated based on a common principle, but are different in the fuels used, catalysts and electrolytes, and/or other aspects.

A fuel cell generates electricity from a membrane-electrode assembly (MEA) that is referred to as a unit cell. The unit cell has a structure in which catalyst layers are disposed on both sides of an electrolyte membrane which is arranged therebetween. The electro-chemical reaction in the anode electrode and the cathode electrode of a typical fuel cell is represented by the following reaction 1.

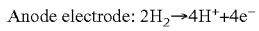

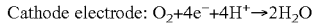     Reaction 1

Hydrogen is supplied in the anode electrode and the hydrogen is dissolved into hydrogen ions and electrons on the catalyst of the anode electrode. The hydrogen ions are moved to the cathode electrode through the electrolyte membrane and the electrons are moved to the cathode electrode, thereby generating electricity. Oxygen included in the air is supplied to the cathode electrode, and the electrons and hydrogen ions moved from the anode electrode and the oxygen are reacted on the catalyst on the cathode electrode, thereby generating water. The reactions are a sort of catalyst reaction and the reactions efficiently occur in at least a predetermined temperature in view of the characteristics of the catalyst reaction.

Hydrogen used in the power generation of the fuel cell may be supplied by reforming fuel in a reformer. A great quantity of heat is required when reforming fuel so that a separate combustor for supplying heat is commonly added in the reformer.

However, the combustor may be supplied with air together with hydrocarbon fuel, and a flashback phenomenon characterized by flames being flowed backward and/or a blow-off phenomenon in which flames are extinguished may be generated if requirements such as supply temperature of fuel and air, supply linear velocity of fuel and air, or equivalence ratio of fuel to air (λ) are not properly controlled. As a result, there is a need for a special control.

In general, techniques of inserting various structures in order to lower the temperature of fuel or air and increase the linear velocity of fuel and air in an effort to suppress the generation of the flashback phenomenon have been well-known.

However, such conventional techniques have problems of increased costs and an increase in volume of the fuel cell due to the insertion of the structures. Therefore, there is a need for a method of suppressing the flashback phenomenon of the combustor, while providing high efficiency combustion, at a lower cost.

SUMMARY

According to embodiments of the present invention, a fuel supply apparatus for a combustor is adapted to prevent or substantially prevent a flashback of the combustor.

According to an embodiment of the present invention, a fuel supply apparatus for a combustor includes a fuel distribution part having a first opening part and a second opening part, the fuel distribution part configured to alternately discharge a fuel from the first opening part and the second opening part; and a housing having a first channel and a second channel, wherein an intermediate part of the first channel is coupled to and in fluid communication with the first opening part, and an intermediate part of the second channel is coupled to and in fluid communication with the second opening part, wherein a first oxidant is flowable in a first end of the first channel, and the first oxidant and the fuel discharged from the first opening part are dischargeable at a second end of the first channel, the intermediate part of the first channel being between the first end of the first channel and the second end of the first channel, and wherein a second oxidant is flowable in a first end of the second channel, and the second oxidant and the fuel discharged from the second opening part are dischargeable at a second end of the second channel, the intermediate part of the second channel being between the first end of the second channel and the second end of the second channel.

In one exemplary embodiment, each of a mixing ratio of the first oxidant to the fuel discharged from the first opening part and a mixing ratio of the second oxidant to the fuel discharged from the second opening part is not within a range that provides maximum combustion efficiency. In one embodiment, the range that provides maximum combustion efficiency is 0.8 to 1.3.

In one exemplary embodiment, an entire mixing ratio of the first oxidant and the second oxidant to the fuel discharged from the first opening part and the fuel discharged from the second opening part is within a range that provides maximum combustion efficiency. A flow of the first oxidant and a flow of the second oxidant may be substantially the same or different.

In one embodiment, the fuel distribution part includes a first intermitter configured to intermit the discharge of the fuel from the first opening part and a second intermitter configured to intermit the discharge of the fuel from the second opening part. Also, at least one of the first intermitter or the second intermitter may include a valve. The fuel supply apparatus may further include a controller adapted to control the first and second intermitters. The fuel distribution part may include a fuel supply path for flowing the fuel therein. The fuel distribution part may be integral with the housing.

In one embodiment, the fuel distribution part is configured to alternately discharge the fuel from the first opening part and the second opening part by rotation of a rotating body rotatable by a pressure of the fuel.

In one embodiment, the fuel distribution part includes a first chamber and a second chamber that are stacked together; a rotor in the first chamber and rotatable by a pressure of the fuel; and a rotation barrier rib in the second chamber and rotatable in connection with rotation of the rotor, and the fuel is flowable into the first chamber and moveable to the second chamber through a passage connecting the first chamber to the second chamber, and the fuel distribution part is configured to alternately discharge the fuel from the first opening part and the second opening part by a pressure of the rotation barrier rib. The fuel distribution part may further include a flywheel configured to support rotation of the rotor and the rotation barrier rib.

In one embodiment, the fuel distribution part further includes a third chamber stacked on the second chamber, and a separation barrier rib in the third chamber.

In one exemplary embodiment, the fuel includes a hydrocarbon material and the oxidant includes air.

Embodiments of a fuel supply apparatus according to the present invention may be mounted to an inlet of a combustor for preventing or substantially preventing a flashback that may be generated from the combustor.

BRIEF DESCRIPTION OF THE DRAWINGS

The accompanying drawings, together with the specification, illustrate some exemplary embodiments of the present invention, and, together with the description, serve to explain principles of embodiments of the present invention.

DETAILED DESCRIPTION

Figure 1:
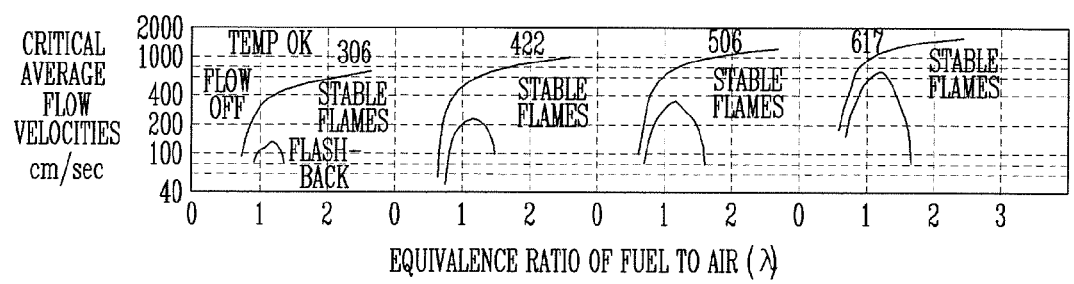
FIG. 1 is a graph showing critical average flow velocities according to the equivalence ratio of fuel to air.

In the following detailed description, only certain exemplary embodiments of the present invention have been shown and described, by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

While studying a method to suppress a flashback phenomenon generated from a combustor, it has been determined that the flashback is easily generated under a condition in which the equivalence ratio ($\lambda$), or mixing ratio, of fuel to air is about 1.1, as shown in FIG. 1.

The $\lambda$ value may be determinative of complete or incomplete combustion and represents the ratio of the amount of fuel to air, assuming that the amount of air is 1. The combustion efficiency is greatest when the mixing ratio is about 1.1.

According to embodiments of the present invention, the generation of the flashback phenomenon is avoidable by applying an artificial pulsation to the flow of air or fuel, while maintaining an average mixing ratio of air to fuel flowed into the combustor from an external apparatus in the range in which maximum combustion efficiency can be provided, thereby suppressing the flashback phenomenon of the combustor and simultaneously performing high-efficiency combustion. Embodiments of a fuel supply apparatus for the combustor adapted to provide such a pulsation are described and shown herein.

Hereinafter, certain exemplary embodiments according to the present invention will be described with reference to the accompanying drawings. Like reference numerals refer to like elements throughout. The shapes of the components, as well as the respective scales of the components depicted in the drawings may be exaggerated for the purpose of explanation.

Figure 2A:
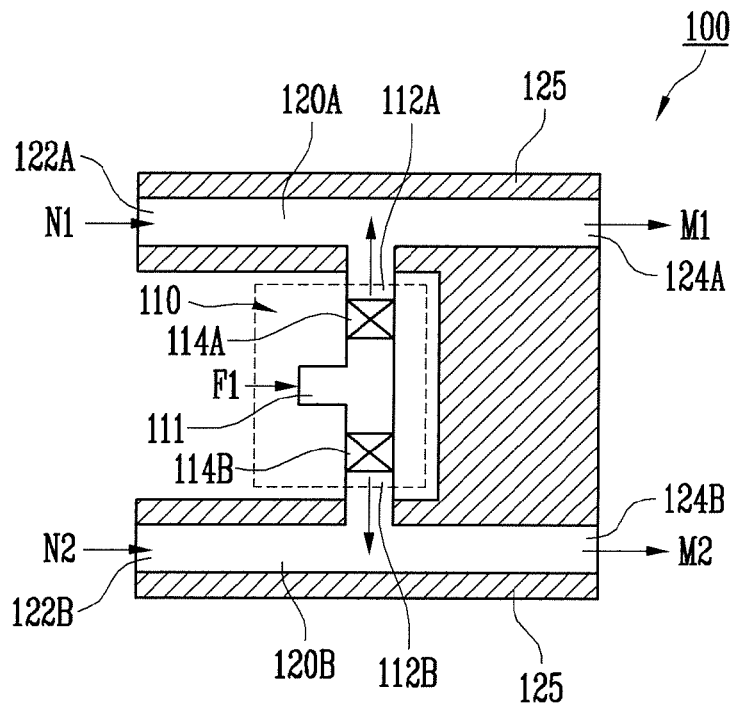
FIG. 2A is a schematic view of a fuel supply apparatus according to an embodiment of the present invention.

FIG. 2A is a schematic view of a fuel supply apparatus 100 according to an embodiment of the present invention.

Referring to FIG. 2A, the fuel supply apparatus 100 according to an embodiment of the present invention includes a fuel distribution part 110 that includes a first opening part 112A and a second opening part 112B for discharging fuel F1, and a housing 125 that includes a first channel 120A and a second channel 120B.

The fuel F1 is flowed into the fuel distribution part 110 so that it may be stored in or distributed from the fuel distribution part 110. The fuel F1 includes hydrocarbon material, for example, butane ($C_4H_{10}$), propane ($C_3H_8$), or any other suitable hydrocarbon material or combination thereof.

The fuel distribution part 110 according to an exemplary embodiment is configured to alternately discharge fuel through the first opening part 112A and the second opening part 112B. To this end, the fuel distribution part 110 includes a first intermitter 114A that intermits fuel passing through the first opening part 112A and a second intermitter 114B that intermits fuel passing through the second opening part 112B. Also, one or both of the first intermitter 114A and the second intermitter 114B may include a valve.

The intermediate part of the first channel 120A is coupled to the first opening part 112A to be in fluid communication therewith, and the intermediate part of the second channel 120B is coupled to the second opening part 112B to be in fluid communication therewith.

A first oxidant N1 is flowed into one end 122A of the first channel 120A, and the first oxidant N1 and the fuel F1 are discharged as mixture M1 at another end 124A of the first channel 120A. Similarly, a second oxidant N2 is flowed into one end 122B of the second channel 120B, and the second oxidant N2 and the fuel F1 are discharged as mixture M2 at another end 124B of the second channel 120B. Also, the fuel distribution part 110 is provided with a fuel supply path 111 through which the fuel F1 is flowed.

In an exemplary embodiment, each of the mixing ratio of the first oxidant N1 to the fuel F1 discharged at the end 124A of the first channel 120A and the mixing ratio of the second oxidant N2 to the fuel F1 discharged at the end 124B of the second channel 120B are outside the range that maximum combustion efficiency is shown. However, the entire, or average, mixing ratio of the first oxidant N1 discharged at the end 124A of the first channel 120A and the second oxidant N2 discharged at the end 124B of the second channel 120B to the fuel F1 includes the range that each maximum combustion efficiency is shown. The range of the mixing ratio of the oxidant to fuel that shows the maximum combustion efficiency is 0.8 to 1.3, and more exemplarily, is 1.0 to 1.2. Also, in an exemplary embodiment, the fuel includes one or more hydrocarbon materials, and the oxidant includes air.

The flow of the first oxidant N1 that is flowed into the end 122A of the first channel 120A and the flow of the second oxidant N2 that is flowed into the end 122B of the second channel 120B may be identical or different. In other words, in embodiments of the present invention, the oxidants may be continuously or discontinuously flowed into one of the ends 122A, 122B of the two channels 120A, 120B, and the flow ratio of the first oxidant N1 and the second oxidant N2 is not limited to a specific ratio.

The mixed fuel and oxidant according to embodiments of the present invention may be flowed into a combustor (not shown) to be burnt and the heat due to the combustion may be transferred to a reformer (not shown) of a fuel cell to provide a heat source required in a reforming reaction. Also, the heat due to the combustion may be supplied to an electricity generation unit (not shown) of the fuel cell to maintain the temperature of the electricity generation unit at a predetermined temperature.

As described above, the entire mixing ratio of the oxidant to the fuel represents the maximum combustion efficiency so that high efficiency combustion can be performed and, at the same time, the fuel F1 is mixed with the first oxidant N1 or the second oxidant N2 to be flowed into the combustor after being alternately discharged through the first opening part 112A and the second opening part 112B so that the instant mixing ratio can be outside the range that the maximum combustion efficiency is shown, thereby making it possible to prevent a flashback from being generated.

Figure 2B:
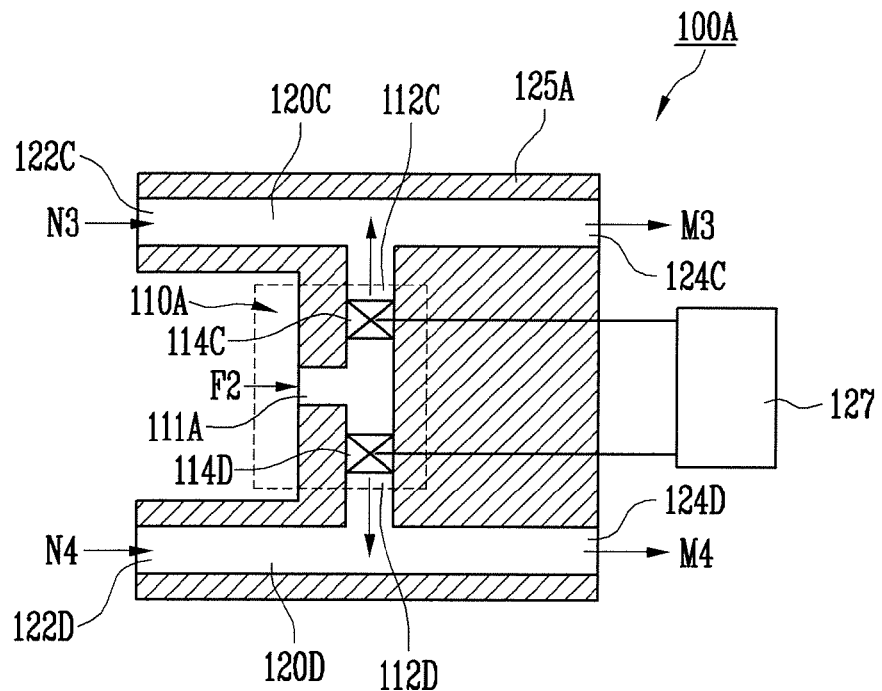
FIG. 2B is a schematic view of a fuel supply apparatus according to another embodiment of the present invention.

FIG. 2B is a schematic view of a fuel supply apparatus 100A according to another embodiment of the present invention.

Referring to FIG. 2B, the fuel supply apparatus 100A includes a fuel distribution part 110A which may include a control apparatus such as a controller and a valve, or any other suitable control apparatus or device, in order to alternately discharge fuel F2 through a first opening part 112C and a second opening part 112D. In one embodiment, the fuel distribution part 110A includes a controller 127 that controls a first intermitter 114C and a second intermitter 114D. Also, in one embodiment, the fuel distribution part 110A is built in or integral with a housing 125A of the fuel supply apparatus 100A.

As described above, the fuel distribution part 110A may include a control apparatus but, in other exemplary embodiments, includes a non-power fuel distribution part. The fuel distribution part according to another embodiment of the present invention is a non-power fuel distribution part that can alternately discharge fuel to the first opening part 112C and the second opening part 112D by the operation of a rotating body that is rotated by a pressure of the fuel.

Hereinafter, the non-power fuel distribution part according to another embodiment of the present invention designed to enable it to alternately discharge fuel will be described.

Figure 3:
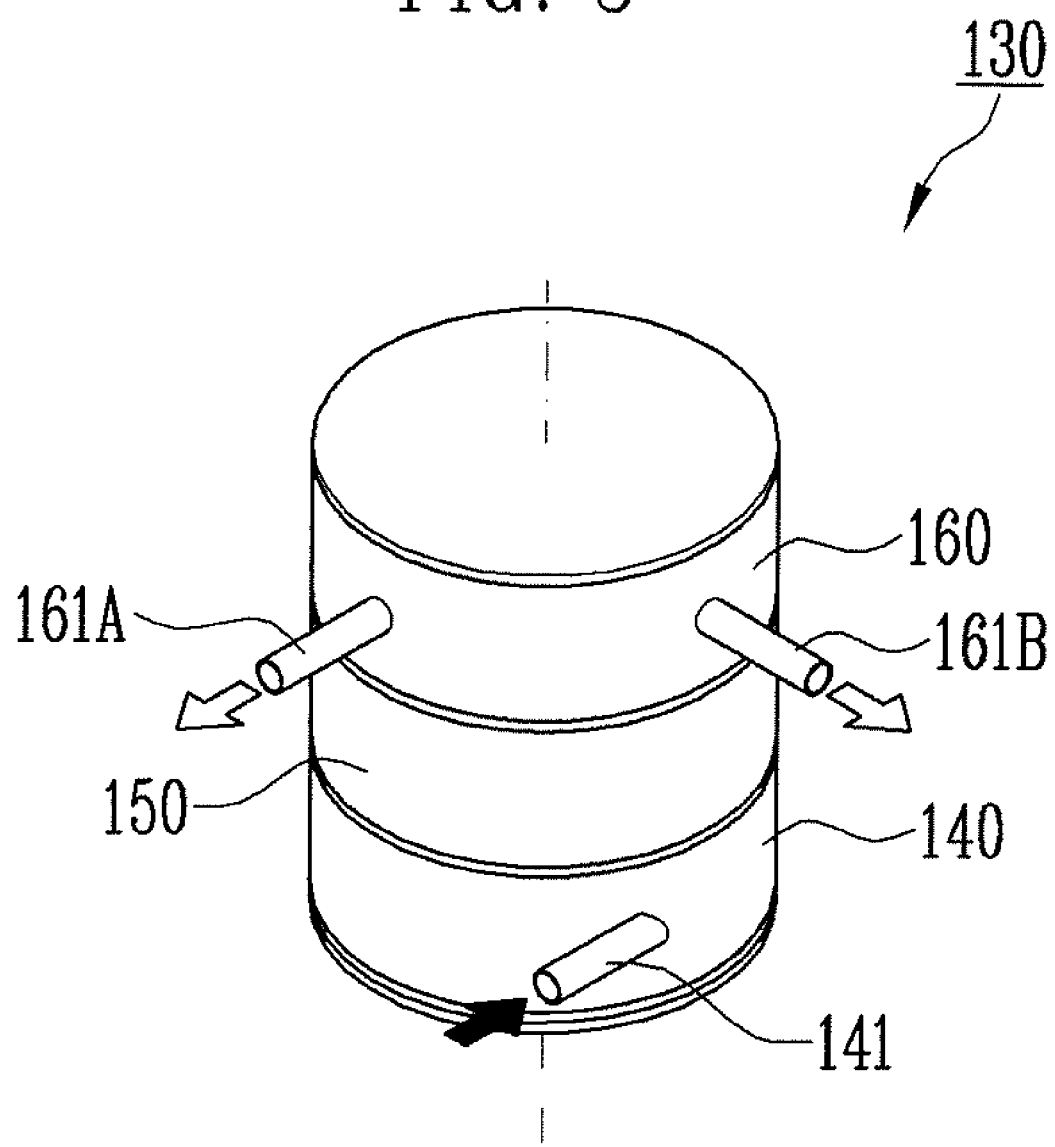
FIG. 3 is a perspective view of a fuel distribution part according to an embodiment of the present invention.
Figure 4:
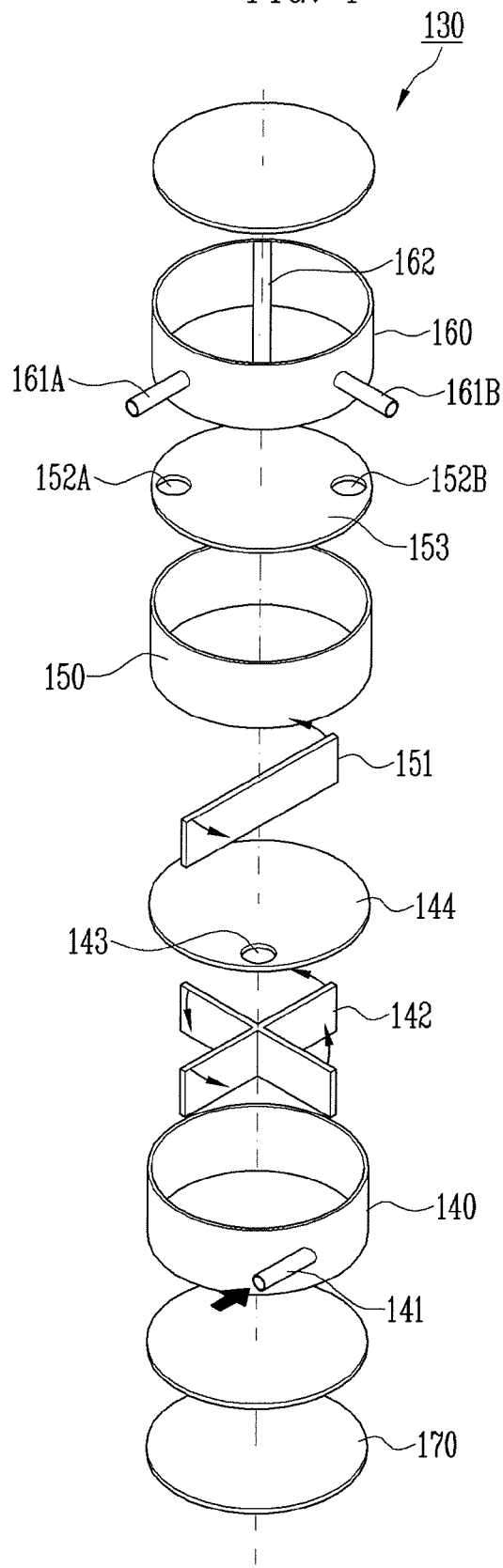
FIG. 4 is an exploded perspective view of the fuel distribution part of FIG. 3.

FIG. 3 is a perspective view of a fuel distribution part 130 according to an embodiment of the present invention, and FIG. 4 is an exploded perspective view of the fuel distribution part 130. Referring to FIGS. 3 and 4, the fuel distribution part 130 includes a first chamber 140 and a second chamber 150 stacked together, a rotor 142 positioned in the first chamber 140 and configured to be rotated, and a rotation barrier rib 151 positioned in the second chamber and configured to be rotated in connection with the rotation of the rotor 142.

Fuel flowed into the first chamber 140 is moved to the second chamber 150 through a passage connecting the first chamber 140 to the second chamber 150, and the fuel is alternately discharged to a first opening part, or passage, 152A and a second opening part, or passage, 152B by the pressure of the rotation barrier rib 151. Also, in one embodiment, the fuel distribution part 130 further includes a flywheel 170 that supports the rotation of the rotor 142 and the rotation barrier rib 151, wherein the flywheel 170 may serve to constantly maintain the rotation velocity of the rotor 142 and the rotation barrier rib 151.

Also, in one embodiment, the fuel distribution part 130 further includes a third chamber 160 that is stacked on the second chamber 150, wherein a separation barrier rib 162 is provided in the third chamber 160.

As described above, when the fuel distribution part 130 is formed by sequentially stacking the first, second, and third chambers 140, 150, and 160, the fuel is alternately discharged from a first opening part, or outlet, 161A and a second opening part, or outlet, 161B. In other words, the first opening part 152A in the fuel distribution part having the first chamber 140 and the second chamber 150 may correspond to the first opening part 161A in the fuel distribution part having the first, second, and third chambers 140, 150, and 160, and the second opening part 152B in the fuel distribution part having the first chamber 140 and the second chamber 150 may correspond to the second opening part 161B in the fuel distribution part having the first, second, and third chambers 140, 150, and 160.

The rotor 142 may be rotated by the pressure of the fuel flowed into the first chamber 140 through a third opening part, or inlet, 141 or may be rotated by rotary power provided by external power, wherein the rotor 142 serves to rotate the rotation barrier rib 151 in connection with the rotation of the rotor 142. Therefore, the fuel flowed into the first chamber 140 may be moved to the second chamber 150 by a path connecting the first chamber 140 to the second chamber 150 through a first outlet 143 provided on a surface 144 of the first chamber 140.

The rotation barrier rib 151 serves to alternately discharge the fuel transferred from the first chamber 140 by being rotated in connection with the rotation of the rotor 142. Therefore, the fuel flowed into the second chamber 150 is alternately discharged through the first opening part 152A and the second opening part 152B provided on a surface 153 of the second chamber 150 by the pressure of the rotation barrier rib 151. In the embodiment of the fuel distribution part in which the first, second and third chambers 140, 150, and 160 are stacked sequentially, the fuel may be alternately discharged from the first opening part 152A and the second opening part 152B to be moved to the third chamber 160. In the third chamber 160, the fuel separated by the separation barrier rib 162 may be alternately discharged through the first opening part 161A and the second opening part 161B.

As described above, if mixed gas of fuel and oxidant that are alternately mixed in two channels is supplied to the combustor, the mixed gas having high $\lambda$ value and low $\lambda$ value is flowed in the combustor in an alternating manner for preventing or substantially preventing a flashback from being generated from the combustor, while maintaining the entire, or average, mixing ratio of the oxidant and fuel supplied to the combustor in the range for which the maximum combustion efficiency is shown.

While the present invention has been described in connection with certain exemplary embodiments, the present invention is not limited thereto. For example, the present invention may be understood in such a manner that oxidant rather than fuel is discharged to the fuel distribution part and fuel rather than oxidant is flowed to the channel to be transferred, or for example, in an embodiment, a structure of the fuel distribution part may have a different orientation from the embodiments shown and described above.

While the present invention has been described in connection with certain exemplary embodiments, it is to be understood that the invention is not limited to the disclosed embodi-

What is claimed is:

1. A fuel supply apparatus for a combustor, the fuel supply apparatus comprising:
a fuel distribution part having a first opening part and a second opening part, the fuel distribution part configured to alternately discharge a fuel from the first opening part and the second opening part; and
a housing having a first channel and a second channel,
wherein an intermediate part of the first channel is coupled to and in fluid communication with the first opening part, and an intermediate part of the second channel is coupled to and in fluid communication with the second opening part,
wherein a first oxidant is flowable in a first end of the first channel, and the first oxidant and the fuel discharged from the first opening part are dischargeable at a second end of the first channel, the intermediate part of the first channel being between the first end of the first channel and the second end of the first channel, and
wherein a second oxidant is flowable in a first end of the second channel, and the second oxidant and the fuel discharged from the second opening part are dischargeable at a second end of the second channel, the intermediate part of the second channel being between the first end of the second channel and the second end of the second channel.

2. The fuel supply apparatus as claimed in claim 1, wherein each of a mixing ratio of the first oxidant to the fuel discharged from the first opening part and a mixing ratio of the second oxidant to the fuel discharged from the second opening part is not within a range that provides maximum combustion efficiency.

3. The fuel supply apparatus as claimed in claim 2, wherein the range that provides maximum combustion efficiency is 0.8 to 1.3.

4. The fuel supply apparatus as claimed in claim 1, wherein an entire mixing ratio of the first oxidant and the second oxidant to the fuel discharged from the first opening part and the fuel discharged from the second opening part is within a range that provides maximum combustion efficiency.

5. The fuel supply apparatus as claimed in claim 1, wherein a flow of the first oxidant and a flow of the second oxidant are substantially the same.

6. The fuel supply apparatus as claimed in claim 1, wherein a flow of the first oxidant and a flow of the second oxidant are different from each other.

7. The fuel supply apparatus as claimed in claim 1, wherein the fuel distribution part comprises a first intermitter configured to intermit the discharge of the fuel from the first opening part and a second intermitter configured to intermit the discharge of the fuel from the second opening part.

8. The fuel supply apparatus as claimed in claim 7, wherein at least one of the first intermitter or the second intermitter comprises a valve.

9. The fuel supply apparatus as claimed in claim 7, further comprising a controller adapted to control the first and second intermitters.

10. The fuel supply apparatus as claimed in claim 1, wherein the fuel distribution part includes a fuel supply path for flowing the fuel therein.

11. The fuel supply apparatus as claimed in claim 1, wherein the fuel distribution part is integral with the housing.

12. The fuel supply apparatus as claimed in claim 1, wherein the fuel distribution part is configured to alternately discharge the fuel from the first opening part and the second opening part by rotation of a rotating body rotatable by a pressure of the fuel.

13. The fuel supply apparatus as claimed in claim 1, wherein the fuel distribution part comprises:
a first chamber and a second chamber that are stacked together;
a rotor in the first chamber and rotatable by a pressure of the fuel; and
a rotation barrier rib in the second chamber and rotatable in connection with rotation of the rotor,
wherein the fuel is flowable into the first chamber and moveable to the second chamber through a passage connecting the first chamber to the second chamber, and the fuel distribution part is configured to alternately discharge the fuel from the first opening part and the second opening part by a pressure of the rotation barrier rib.

14. The fuel supply apparatus as claimed in claim 13, wherein the fuel distribution part further comprises a flywheel configured to support rotation of the rotor and the rotation barrier rib.

15. The fuel supply apparatus as claimed in claim 13, wherein the fuel distribution part further comprises a third chamber stacked on the second chamber, and a separation barrier rib in the third chamber.

16. The fuel supply apparatus as claimed in claim 1, wherein the fuel comprises a hydrocarbon material and the oxidant comprises air.

* * * * *